United States Patent
Giroux et al.

(10) Patent No.: US 6,618,378 B1
(45) Date of Patent: Sep. 9, 2003

(54) METHOD AND APPARATUS FOR SUPPORTING MULTIPLE CLASS OF SERVICE CONNECTIONS IN A COMMUNICATIONS NETWORK

(75) Inventors: Natalie Giroux, Ottawa (CA); Mustapha Aissaoui, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/358,390

(22) Filed: Jul. 21, 1999

(51) Int. Cl.[7] .......................... H04L 12/28; H04L 12/56
(52) U.S. Cl. ..................... 370/395.1; 370/401; 370/235
(58) Field of Search .................... 370/395.1, 395.21, 370/395.42, 395.43, 395.52, 395.6, 389, 229, 237, 232, 236.1, 465, 466, 467, 474, 400, 401, 236.2, 235, 235.1, 392, 396, 397

(56) References Cited

U.S. PATENT DOCUMENTS

| | | | | |
|---|---|---|---|---|
| 5,754,530 A | * | 5/1998 | Awdeh et al. ................ 370/234 |
| 6,028,840 A | * | 2/2000 | Worster ....................... 370/230 |
| 6,034,945 A | * | 3/2000 | Hughes et al. ............... 370/230 |
| 6,091,708 A | * | 7/2000 | Matsunuma ................. 370/233 |
| 6,122,253 A | * | 9/2000 | Jones .......................... 370/235 |
| 6,188,689 B1 | * | 2/2001 | Katsube et al. ............. 370/252 |
| 6,188,690 B1 | * | 2/2001 | Holden et al. .............. 370/390 |
| 6,219,728 B1 | * | 4/2001 | Yin ............................. 370/229 |

OTHER PUBLICATIONS

Crawley, E. (Editor), "A Framework for Integrated Services and RSVP over ATM," Internet Engineering Task Force, Internet Draft, draft-ietf-issll-atm-framework-02.text, Feb. 9, 1998.

Nichols, K., (Editor), "Differentiated Services Operational Model and Definitions", Internet Engineering Task Force, Internet Draft, draft-nichols-dsopdef-00.txt, Feb. 1998.

* cited by examiner

*Primary Examiner*—Douglas Olms
*Assistant Examiner*—Brian Nguyen
(74) *Attorney, Agent, or Firm*—Marks & Clerk (57) ABSTRACT

The method of the invention includes the step of transmitting a priority indicator containing information indicating the priority of network traffic over a connection to a downstream node in a communications network. The downstream node has a queue for queuing traffic received over the connection and the queue has an adjustable discard range. After transmitting the priority indicator, the network traffic is transmitted over the connection. When the priority indicator is received at the downstream node the discard range is adjusted to correspond to the priority indicated in the priority indicator. At the downstream node the network traffic is stored in the queue if a queue congestion measure is outside the discard range and discarded if the queue congestion measure is within the discard range. The priority indicator may be a Resource Management cell or may be provided in the header of a cell carrying the network traffic.

23 Claims, 6 Drawing Sheets

METHOD AND APPARATUS FOR SUPPORTING MULTIPLE CLASS OF SERVICE CONNECTIONS IN A COMMUNICATIONS NETWORK

FIELD OF THE INVENTION

The invention generally relates to telecommunication networks and more specifically to a method and apparatus for carrying multiple classes of service over a single connection or channel in a connection oriented communications network, for instance an Asynchronous Transfer Mode (ATM) network.

BACKGROUND OF THE INVENTION

One of the main attractions of ATM is the ability to use ATM networks to carry information for a number of different modes of communication (e.g.telephone, video, Internet) over a single communications network. The basic unit of ATM communication is the 53 byte ATM cell which consists of 5 bytes of header information and 48 bytes of data referred to as the payload. All information is switched and multiplexed in an ATM network in these fixed length cells. The cell headers contain information about the destination of the cell, the types of information in the payload (user data, signalling data, maintenance information), the relative priority of the payload and error checking.

ATM networks are logically constructed of virtual paths (VPs) and virtual channels or connections (VCs). The VPs and VCs are implemented on physical transmission paths but are not necessarily synonymous with the physical links in the network. ATM cell traffic may be managed to create multiple VPs on a single physical transmission path. Likewise, VPs may contain one or more VCs. Switching can be performed at either the transmission path, VP or VC level. The concept of establishing and using VCs and VPs in an ATM network is well known to those skilled in the art of network engineering.

Because it is a recognized goal of ATM to enable multiple modes of communication to use a common network infrastructure, ATM networks must be able to accommodate a variety of service requirements for different communications applications. For example, real-time applications such as telephone communications require a higher level of service than non-real-time applications such as those relating to typical Internet transmissions. It may also be desirable to be capable of distinguishing among different levels of service within each of the real-time and non-real-time categories.

In order to implement different levels of service, typically a different VC for each desired level of service is needed. The level of service of a VC is characterized by, among other parameters, the cell loss ratio corresponding to the ratio of lost cells to transmitted cells. Cells are discarded in an ATM network during traffic congestion when buffers at the nodes of the network become full or near full. Cells transmitted over VCs with higher levels of service are less likely to be discarded than cells transmitted over VCs with lower levels of service.

Within a single VC, the cell loss ratio of individual cells may also be determined according to the priority of the cell. A field called the Cell Loss Priority (CLP) field in the header of the cell indicates whether the cell should be discarded before other cells in the same VC. The CLP field consists of a single bit which is set to a 0 when the cell is of the highest priority and a 1 when the cell has lower priority. Thus, cells with the CLP bit set to 1 are dropped during congested periods before cells with higher priority. This helps to maintain a lower cell loss ratio for the higher priority traffic.

The Internet is one of the many modes of communication which ATM networks can accommodate. The Internet is a network of networks which employs the IP communications protocol and is used for transmitting various forms of non-real-time traffic including text, data, sound and video. The IP protocol is a packet switched protocol which uses variable length headers and variable length payloads. The IP protocol specifies the format for the packet used in IP systems. It is common for IP packets to be much larger than the standard 48 byte ATM cell payload.

In the past, IP supported only one level of service. This and other factors are reasons that the Internet was previously not considered an appropriate medium for real-time communication. The IP protocol provided a bit in the IP packet header for specifying the priority of the packets. The intended function of this bit is similar to the CLP field in ATM cells, however, it has not been the practice to use this bit to specify the priority of the packet, and the bit is now called the "In and Out of Profile" bit. Recently there have been discussions within the standards community of the Internet to increase the number of priority levels for IP packets so that the Internet may be used to accommodate a range of classes of service over the Internet. For example, the Internet Engineering Task Force has discussed the possibility of introducing a three-bit class of service field in the IP header which could be used to specify up to eight classes of service.

Currently a single VC in an ATM network is capable of supporting two levels of service which can be differentiated by the setting of the CLP bit. In the past this was sufficient to share the same VC among various Internet connections together with non-Internet connections where all traffic on the VC was associated with one of two different priorities. This was satisfactory since all Internet traffic would have been undifferentiated. With the advent of more than two classes of service over the Internet it would no longer be possible to carry all classes of Internet traffic over a single VC while maintaining the differentiated classes of service of the Internet traffic.

The requirement to use of multiple VCs for carrying different classes of service reduces the available addressing space for VCs. It will be appreciated that VC addressing space is limited in an ATM network by the size of the Virtual Channel Identifier (VCI) field in the ATM cell header. The VCI field is 16 bits, allowing for the identification of 65,536 separate VCs. The Internet and IP networks are connectionless communications networks which employ mesh networks which provide multiple alternate paths for routing traffic. When IP networks are provisioned using ATM, the implementation of the mesh topology tends to require a large number of VCs which places significant demands on VC address space in the ATM network. The accommodation of additional classes of service would place additional strains on the limited VC addressing space.

It is an object of this invention to provide a method and apparatus for allowing more than two classes of service to be carried on a single connection in a communications network. It is a further object of the present invention to provide a method and apparatus for allowing more than two classes of service to be carried on a single VC in an ATM network. It is a yet further object of this invention to provide a method for supporting IP classes of service over fewer VCs. In this disclosure, the terms class of service and priority are used interchangeably to refer to the relative importance of the traffic in question. Also in this disclosure, the term virtual channel is considered to be equivalent to the term virtual connection.

SUMMARY OF THE INVENTION

According to a first broad aspect, the invention provides a method for transmitting traffic associated with different priorities over a single connection in a communications network, including the steps of: (a) transmitting a priority indicator over the connection to a downstream node in the communications network, the downstream node having a queue for queuing traffic received at the downstream node over the connection, the queue being associated with a congestion measure indicative of congestion in the queue and having an adjustable discard range corresponding to traffic carried over the connection, the priority indicator including information for identifying the priority of traffic on the connection, (b) after transmitting the priority indicator, transmitting the traffic over the connection, wherein when the priority indicator is received at the downstream node the discard range is adjusted to correspond to the priority identified in the priority indicator, and when the traffic is subsequently received at the downstream node the traffic is stored in the queue if the congestion measure is outside the discard range and the traffic is discarded if the congestion measure is within the discard range.

According to illustrative embodiments corresponding to the first broad aspect of the present invention, the communications network may be an ATM network and the priority indicator may be a resource management (RM) cell. As well, in another illustrative embodiment thereof, the traffic may be transmitted by an ATM network interface and the method may further include the steps of (i) receiving non-ATM traffic at the ATM network interface, the non-ATM traffic including information indicating the priority of the non-ATM traffic, and (ii) detecting the priority of the non-ATM traffic, wherein the, information in the priority indicator corresponds to the detected priority of the non-ATM traffic.

According to a second broad aspect of the present invention, the invention provides a communications network having a connection for transmitting traffic over the communications network, a network interface associated with the connection and a downstream node. The network interface is for receiving incoming traffic having a particular priority, for transmitting on the connection a priority indicator comprising information identifying the priority of the incoming traffic, and for transmitting the incoming traffic on the connection as network traffic. The downstream node is connected to the network interface by way of the connection and has a queue for queuing network traffic received on the connection at the downstream node. The queue is associated with a congestion measure indicative of congestion in the queue and has an adjustable discard range corresponding to traffic carried over the connection. When the priority indicator is received at the downstream node the discard range is adjusted to correspond to the priority identified in the priority indicator. Network traffic thereafter received at the downstream node is placed in the queue if the congestion measure is outside the discard range and not placed in the queue if the congestion measure is within the discard threshold.

According to a third broad aspect of the present invention, the invention provides an apparatus in a communications network for transmitting traffic associated with one of a plurality of different priorities over a connection to a downstream node having a queue associated with a congestion measure indicative of congestion in the queue. The queue has an adjustable discard range corresponding to traffic carried over the connection. The apparatus has an output port connecting the apparatus to the connection. The apparatus transmits to the downstream node a priority indicator comprising information for identifying the priority of the traffic. The downstream node receives the priority indicator and adjusts the discard range of the queue to correspond to the priority identified in the priority indicator. After the apparatus transmits the priority indicator the apparatus transmits the traffic to the downstream node.

According to a fourth broad aspect of the present invention, the invention provides an apparatus for receiving traffic from a connection in a communications network. The traffic includes network traffic and priority indicators therefor. The apparatus includes a queue for storing cells received on the connection. The queue is associated with a congestion measure indicative of congestion in the queue. The queue has a discard range corresponding to traffic carried over the connection and adjustable to correspond to the priority of the received traffic. Each priority indicator includes information indicating the priority of the network traffic which will be received by the apparatus subsequent to the reception of the priority indicator. The discard range, is adjusted to correspond to the priority identified in the priority indicator when a priority indicator is received by the apparatus. The network traffic is stored in the queue if the congestion measure is outside the discard range, and the network traffic is not stored in the queue if the congestion measure is within the discard range.

According to a fifth broad aspect of the present invention, the invention provides a method for transmitting traffic associated with one of a plurality of different levels of priority over a single connection in an ATM network using ATM cells, each ATM cell having a cell header with a first and a second priority-indicating bit, the method including the steps of (a) in an ATM cell carrying the traffic, setting the first and second priority-indicating bits to values corresponding to the level of priority of the traffic; (b) transmitting the ATM cell over the connection to a downstream node having a queue associated with a congestion measure and having a plurality of discard ranges each corresponding to the different levels of priority; (c) at the downstream node, receiving the ATM cell transmitted over the connection and checking the first and second priority-indicating bits thereof to determine the level of priority of the received ATM cell; and (d) queuing the received ATM cell in the queue if the congestion measure is outside the discard range corresponding to the level of priority of the ATM cell, and discarding the ATM cell if the congestion measure is within the discard range corresponding to the level of priority of the ATM cell.

According to illustrative embodiments corresponding to the fifth broad aspect of the present invention, the first priority-indicating bit may be the Cell Loss Priority (CLP) bit. As well, the fifth priority-indicating bit may be the Explicit Forward Congestion Indication (EFCI) bit where the EFCI bit is not utilized to indicate congestion over the connection. The queue may have a CLP discard threshold associated with a first discard range and an EFCI discard threshold associated with a second discard range, wherein during step (d) the ATM cell is discarded if the CLP bit is set to 1 and the size of the queue is greater than or equal to the CLP discard threshold, and the ATM cell is discarded if the EFCI bit is set to 1 and the size of the queue is greater than or equal to the EFCI discard threshold.

With further reference to illustrative embodiments, the queue according to the fifth broad aspect of the present invention may have first, second and third discard ranges defined by first, second and third discard thresholds, the second discard threshold being greater than the first discard threshold and the third discard threshold being greater than the second discard threshold. The first discard range corresponds to level of priority indicated by both the CLP and EFCI bits being set to 1, with the second discard range corresponding to the level of priority indicated by the CLP bit being set to 1 and the EFCI bit being set to 0, and the third discard range corresponding to the level of priority indicated by the CLP bit being set to 0 and the EFCI bit being set to 1.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF PREFERRED EMBODIMENTS

Figure 1:
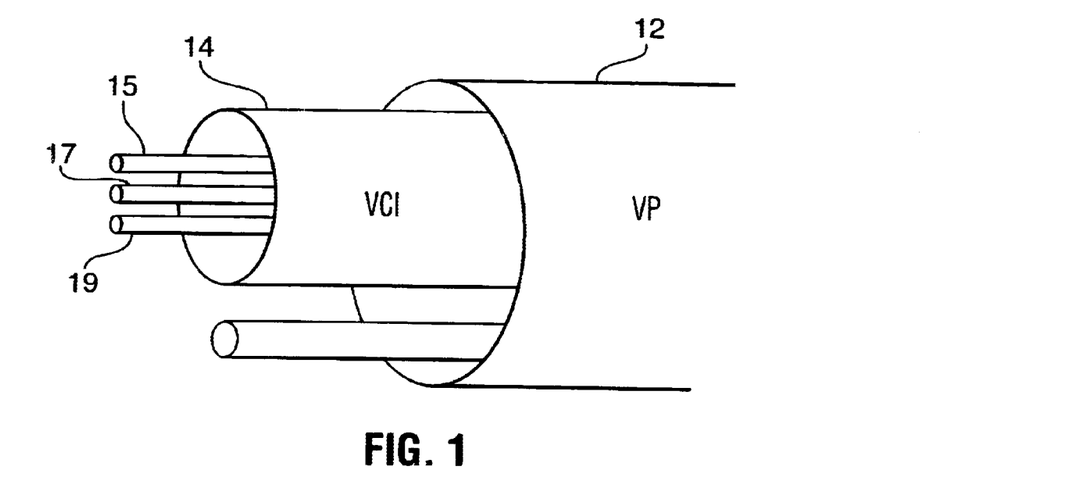
FIG. 1 is a graphical representation of a portion of an ATM network implementing a preferred embodiment of the present invention.

FIG. 1 shows a portion of an ATM network 10 which is an example of a connection oriented network in which a preferred embodiment of the method of the present invention may be implemented. A Virtual Path (VP) 12 carries a number of Virtual Channels (VCs) of which VC1 14 is one. VC1 14 is capable of carrying more than two classes of service. For instance, VC1 14 may carry first, second and third traffic flows 15, 17, 19 where each of these traffic flows may originate from a different traffic source and may be associated with differentiated classes of service. Although represented as separate streams in FIG. 1, the traffic flows in 15, 17, 19 may be carried on a common physical link as will be appreciated by those skilled in the art.

Figure 2:
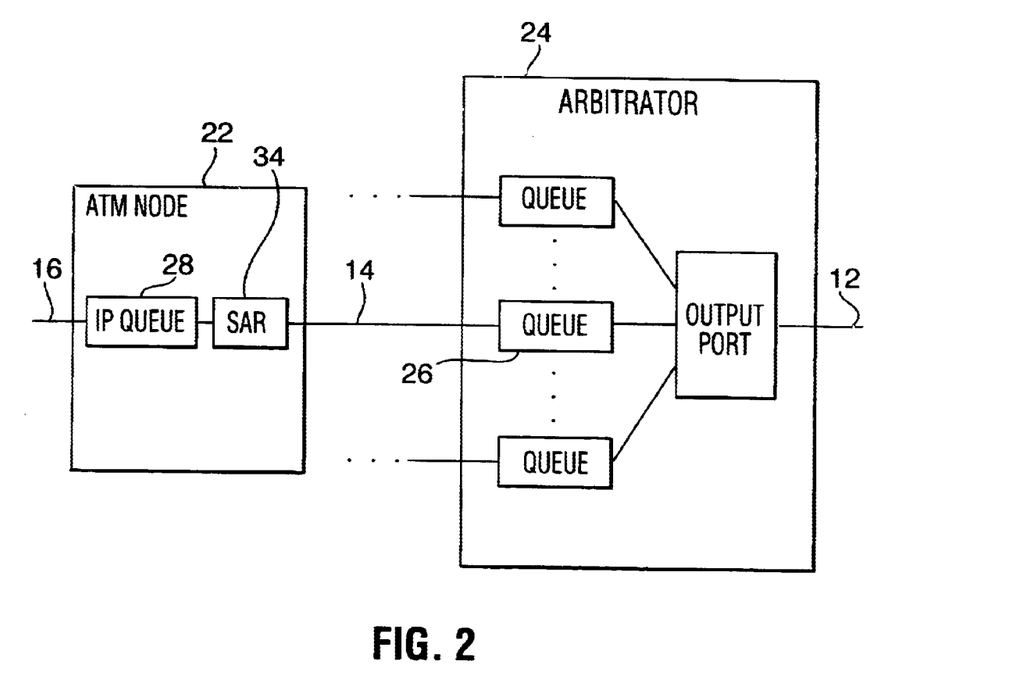
FIG. 2 is a block diagram of the ATM network of FIG. 1.

Referring to FIG. 2, traffic, such as that received in an IP traffic flow 16, is transmitted onto VC1 14 by an ATM node 22. The traffic received on the IP traffic flow 16 is in the form of IP packets. Thus, the ATM node 22 serves as an ATM interface between an IP network and an ATM network. It will be appreciated however, that alternatively other forms of traffic may be received at the ATM node 22, including ATM traffic.

The traffic received at the ATM node 22 may be associated with different priorities or classes of service. For example, the IP packets received from the IP traffic flow 16 may be associated with different priorities or classes of service as specified in the IP packet headers. Where the ATM node 22 receives non-ATM traffic, the ATM node 22 converts the non-ATM traffic into ATM cells for transmission on an ATM network. The ATM node 22 may be an IP router or similar IP/ATM interface known to those skilled in the art. In the case of the IP traffic flow 16, the ATM node 22 converts IP, packets received from the IP traffic flow 16 into ATM cells and transmits the cells over VC1 14. The ATM node 22 may be connected to more than one VC in which case the ATM node 22 would perform the additional task of switching the ATM cells to the appropriate VC.

The ATM node 22 also transmits (and may receive) resource management cells (RM cells) to and from other nodes in the ATM network 10. RM cells are typically used in ATM networks to dynamically manage bandwidth and buffering resources. The use of RM cells to dynamically manage network resources is known in the art. In a first illustrative embodiment of the present invention, RM cells are used for an additional purpose, which is specifying the relative class of service of a subsequent stream of cells. The use of the RM cells to indicate priority of cells in addition to using the CLP field in the ATM cell header enables a single VC to carry a greater number of classes of service. The method by which this is accomplished is explained in more detail below. Although RM cells are the preferred priority indicators, those skilled in the art will appreciate that other priority indicators could be used instead. For instance, according to a second illustrative embodiment, unused bits in the ATM cell header may be used in addition to the CLP bit to indicate more than two levels of priority.

Queues are implemented at nodes in the ATM network 10 in order to handle network traffic congestion. Various queue architectures are used in ATM networks and the methods of the present invention may be implemented with various types of queues. One type of queuing architecture is a per-VC queue, so called because at the point of congestion where traffic is queued, a separate queue is provided for each VC. Another type of queuing architecture is an aggregate queue in which cells from different VCs are queued in the same queue. Per-VC queuing allows an ATM network to perform more sophisticated traffic shaping and arbitration between queues. Per-VC queuing is often performed at contention points in an ATM network. An example of such a contention point is an aggregation point at which VCs are combined onto a common VP. Other typical contention points in a network include devices such as switches, bridges and hubs where the rate of incoming traffic has the potential of exceeding the servicing rate of the device.

Traffic on VC1 14 is queued and combined with traffic from other VCs onto the VP 12 at a VP aggregation point 24. The VP aggregation point 24 may be implemented with an ATM switch which is capable of processing the ATM cells and managing queues. It can be seen that the VP aggregation point 24 employs a per-VC queue architecture, providing a queue for each incoming VC. A queue 26 is provided for traffic received on VC1 14. The VP aggregation point 24 is an example of a downstream node which is a contention point at which per-VC queuing is performed, and in which an illustrative embodiment of the invention may be implemented. Those skilled in the art will appreciate that the method of the invention may be implemented in contention points other than the VP aggregation point 24 which is used only as an example herein.

The VP aggregation point 24 arbitrates between the incoming VCs according to a predetermined arbitration scheme. For example, the VP aggregation point 24 may implement an exhaustive priority scheduling scheme where the VC with the highest priority is serviced until the queue for that VC is empty. An alternative arbitration scheme may be a weighted round robin arbitration in which each VC queue is serviced in sequence and the number of cells transmitted from a VC is a function of the priority of the VC relative to the priority of other VCs and the number of cells currently in the queue. Other appropriate arbitration schemes will be known to those skilled in this art.

The VP aggregation point 24 maintains the queue 26 and ensures that it does not become full. If the queue 26 becomes full then all incoming cells will be lost regardless of their priority. Therefore, in order to ensure that there will be room for high priority cells in the queue 26, the CLP field of incoming cells may be checked so that lower priority cells can be discarded and not stored in the queue in order to leave room for the possible arrival of higher priority cells. One method of doing this involves checking the size or length of the queue whenever an incoming cell is received. If the queue size is within a predetermined discard range then the cell may be discarded if its CLP field indicates that the cell is not high priority, The discard range may be defined by a single discard threshold, for instance. When the queue size exceeds the discard threshold, it is within the discard range. This ensures that a certain minimum portion of space available to the queue is reserved for higher priority cells. Cell discard decisions may be based on other congestion measures instead of queue size. For example, the rate of queue growth may be used as a measure of congestion. Other measures of congestion will be known to those skilled in this art. Because the CLP field in the ATM header is only one bit in length, it was only possible in the prior art to distinguish between two priorities of cells within a single VC.

Queuing may also be performed at the ATM node 22. For example, IP packets received over the IP traffic flow 16 are queued in an IP queue 28. Other traffic flows received at the ATM node 22 may also be queued. All traffic received at the ATM node 22 may be queued in the same queue or alternatively, separate queues may be provided for each traffic flow. This may be desirable where the traffic flows received at the ATM node 22 need to be serviced differently.

Once queued, IP packets from the IP traffic flow 16 are then segmented and merged onto the appropriate VC, for example VC1 14 by a segmentation and reassembly (SAR) device 34. Where non-ATM traffic is provided to the ATM node 22, as is the case with the IP traffic flow 16, the non-ATM traffic is passed from the queues to the SAR device 34 which performs the segmentation of the non-ATM traffic into ATM cells. It will be appreciated by those skilled in the art that the ATM node 22 may perform a switching function for routing traffic onto VCs. For example, IP packets received on the IP traffic flow 16 could be mapped to several possible VCs based on the address in the IP packet header. For simplicity, however, it will be assumed that all IP packets received on the IP traffic flow 16 share a common destination and are mapped to VC1 14. It will be understood by those skilled in the art that various schemes for merging traffic onto VC1 14 and arbitrating among the various connections at the ATM interface are possible.

Although it is not possible in the prior art to specify more than one priority for Internet traffic, proposals have been made to use three bits in the TOS (type of service) field of the IP header to specify up to eight different classes of service. Thus, the IP traffic flow 16 would be capable of providing IP packets to the ATM node 22 having differentiated priorities or classes of service. In the prior art, incoming traffic flows sharing a common destination, but having different classes of service, would have to have been mapped to separate VCs in order to preserve their relative priority. In the ATM network 10 according to the present invention, more than two classes of IP service may be recognized and carried over VC1 14.

According to the first illustrative embodiment of the present invention, in order to preserve the relative priority of the IP packets received on the IP traffic flow 16, the SAR device 34 prefaces each series of cells of a particular priority with an RM cell which indicates that priority. The RM cell contains information that indicates to downstream contention points in nodes, such as VP aggregation point 24, that the cells following the RM cell have the priority specified in the RM cell. When the ATM node 22 begins to segment and transmit an IP packet having a different priority than the IP packet previously transmitted over VC1 14, the ATM node 22 sends an RM cell over VC1 14 to the VP aggregation point 24 node to indicate a change in priority of the subsequent cells.

Figure 3:
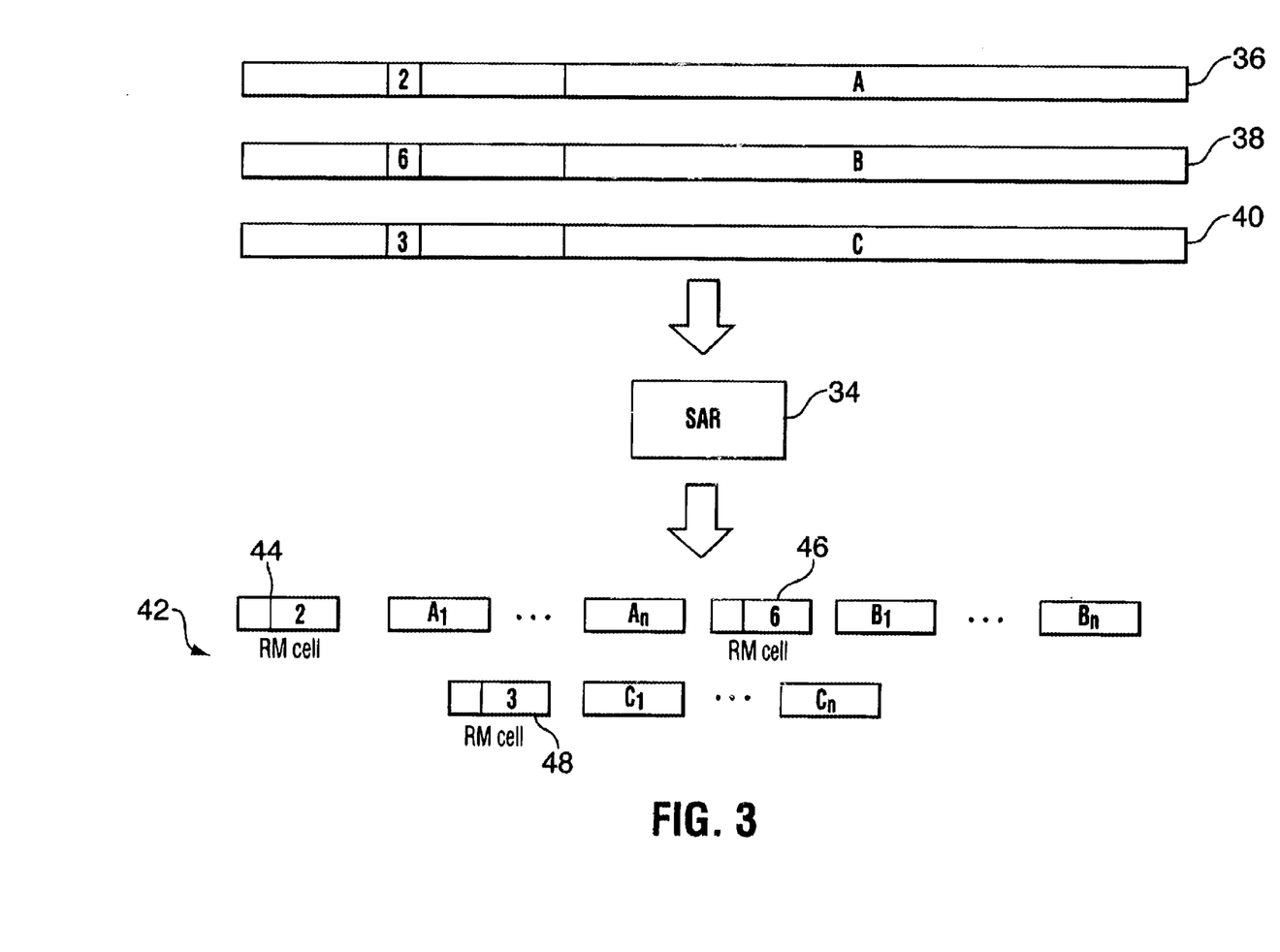
FIG. 3 is a block diagram showing the inputs and outputs of a segmentation and reassembly (SAR) device of the ATM network of FIG. 2.

FIG. 3 shows an example of a series of ATM cells which is generated by the SAR device 34 according to the first preferred embodiment of the invention. In this example, packet A 36, packet B 38 and packet C 40 are segmented into a stream of ATM cells 42 which are sent onto a single VC. The packets 36, 38, 40 each have a different class of service which is specified in the header of each packet. Packet A 36 has a class of service of "2", packet B 38 has a class of service of "6", and packet C 40 has a class of service of "3". For the purposes of this example, a lower number indicates a higher class of service.

The SAR device 34 segments the packets 36, 38, 40 into the stream of ATM cells 42. The stream of ATM cells 42 includes RM cells 44, 46, 48 which contain information indicating the priority of the subsequent ATM cells. The SAR device 34 sends the stream of ATM cells 42 onto a VC such as VC1 14. The order of the cells in the stream of ATM cells 42 must be maintained in order for downstream nodes to determine the priority of the traffic from the RM cells 44, 46, 48. In addition, no other cells may be inserted or interleaved with the stream of cells such that the priority indicators are incorrect. The packets 36, 38, 40 are segmented into n cells, where n is equal to the IP packet size in bytes divided by 48 (the size of the ATM payload) and rounded up to an integer value. (In ATM Adaptation Layer 5 (AAL5), which is commonly used in IP over ATM applications, a padding field is added to the IP packet before segmentation such that the size of the IP packet with the padding is a multiple of 48.) If the packets 36, 38, 40 are of different lengths, then n will be different for each stream of cells. It is also possible for the RM cells to contain additional information, including information regarding the subsequent stream of cells.

Instead of using RM cells as priority indicators, other priority indicators recognizable at downstream contention points could be used to convey the priority information, as those skilled in the art will appreciate. For example, in a variation of the first illustrative embodiment of this invention, regular ATM cells could be used instead of the RM cells to provide the priority information to downstream nodes. The ATM Adaptation Layer (AAL) could be modified such that the first cell of the IP packet would contain class of service information and thus perform the function of the RM cells in the first illustrative embodiment. The ATM Adaptation Layer (AAL) is the ATM protocol layer at which IP packets are segmented into ATM cells. AAL5 is the protocol used to segment IP traffic into ATM cells. In the variation of the first illustrative embodiment of the invention the first cell produced by AAL5 would contain information indicating the priority of the packet.

Referring again to FIG. 2, traffic received over VC1 14 by the VP aggregation point 24 is queued in the queue 26. The VP aggregation point 24 maintains a discard range corresponding to a congestion measure used for the queue 26. The VP aggregation point 24 may also maintain a discard range for the other queues. When a cell transmitted on VC1 14 is received at the VP aggregation point 24, the congestion measure of the queue 26 is compared to the discard range for the queue 26. If the congestion measure of the queue is outside the discard range then the cell is added to the queue 26. If the congestion measure of the queue within the discard range then the cell is discarded.

The preferred congestion measure used for the queue 26 is queue size. In this case, the discard range corresponds to the size of the queue at which cell discard is performed. (The "size" of the queue in this context refers to the number of cells stored in the queue at a particular time.) The lower limit of the discard range may be defined by a discard threshold, which when exceeded will cause cell discard to be performed. The upper limit of the discard range may be left unspecified, in which case it will be infinity. Alternatively the upper limit may be specified as a lower value. In the illustrative embodiment, the discard range is defined only by a discard threshold representing the lower limit of the discard range and the upper limit is left unspecified.

Multiple priorities are accommodated in the VC1 14 by varying the discard threshold of the queue 26 for each change in priority of cells. Whenever an RM cell is received at a contention point, such as the VP aggregation point 24, it is checked to see if it contains class of service information. If the RM cell contains class of service information, the VP aggregation point 24 changes the discard threshold for the queue 26 to the value corresponding to the class of service specified in the RM cell. The discard threshold is lower for lower classes of service and higher for higher classes of service. Thus, the discard threshold is a pre-selected value which changes according to classes of service indicated by the RM cells. The particular discard threshold value for each class of service is a network design consideration which depends on the relative importance of the classes of service, network transmission speeds and queue limitations.

Class of service information may be indicated in the RM cells according to various methods. FIG. 3 shows one possible method where the RM cells indicate the priority level of the segmented traffic. In this first method the priority information in an RM cell must be mapped to an associated discard range for the queue in which the traffic will be stored. The mapping may occur at the VP aggregation point 24 which would be configured to recognize the priority levels in received RM cells and would then adjust the discard range for the queue to a range that corresponds to that priority level. In this method, the priority information in the RM cell may be identical to the original priority information in the IP packets. Alternatively the original priority information in the IP packets may be mapped to a separate set of priority indication codes to be used in the RM cells. For this alternative, contention points such as the VP aggregation point 24 would be configured to recognize the separate set of codes used in the RM cells. This alternative would enable the original priorities to be mapped to a set comprising fewer levels of priority. For instance, the original priorities may be mapped to the separate set of priorities on a two-to-one basis. To take IP with the proposed three bit TOS field as an example, the eight levels of priority in IP could be mapped to only four levels of priority in the ATM network, each level corresponding to two levels of priority in IP.

Another method for indicating class of service information in the RM cells might involve representing the discard range or threshold as a percentage of maximum queue size, wherein the percentage corresponds to the level of priority. In this method, higher percentages would be specified for higher priority traffic. When the RM cell is received at a contention point with a queue, such as the VP aggregation point 24, the discard threshold for the queue would be set to be equal to that percentage of the maximum queue size as indicated in the RM cell. This method would involve mapping the priority information in the IP packets to percentage discard threshold values. This mapping may be done by the SAR device 34.

ATM traffic is sometimes converted into another traffic format before it is provided to an end user. For example, where IP is provided over ATM, ATM cells are typically reassembled into IP packets before being provided to the end user. Alternatively, the end user may receive the ATM cells and reassemble the IP packets itself It will be appreciated by those skilled in the art that during this reassembly the RM cells which indicate the class of service or priority information are not required to reconstruct the IP packets as they do not contain any header or payload information for the IP packets. Therefore, upon reassembly of the ATM cells to IP packets, or upon conversion to another form of traffic, the priority-indicating RM cells may be discarded.

Figure 4:
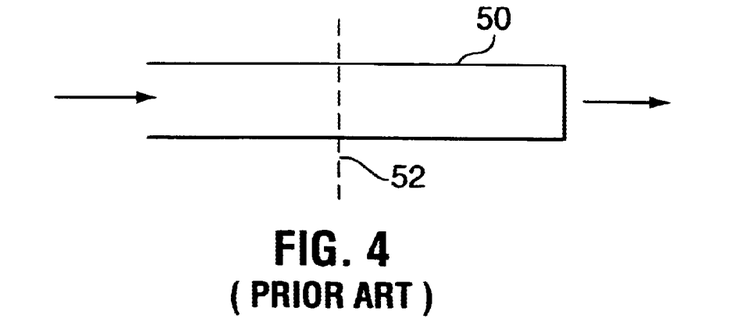
FIG. 4 is a diagram of a queue according to the prior art.

The methods for distinguishing different levels of priority over a single connection in a network disclosed herein may be combined with the existing CLP bit in the ATM cell to accommodate still more levels of priority in a single connection. This may be accomplished in several ways. FIG. 4 shows a queue 50 of the prior art having a discard threshold 52 which is static. The front of the queue 52 is to the right of the discard threshold 52. The queue 50 may be contained in any network device, for example VP aggregation point 24. As long as the size of the queue 50 does not exceed the discard threshold 52, all ATM cells received by the network device may be stored in the queue 50 regardless of whether they are low priority (i.e. CLP=1) or high priority (i.e. CLP=0). However, when the size of the queue 50 exceeds the discard threshold 52, only high priority ATM cells (CLP=0) received by the network device may be stored in the queue 50.

Figure 5:
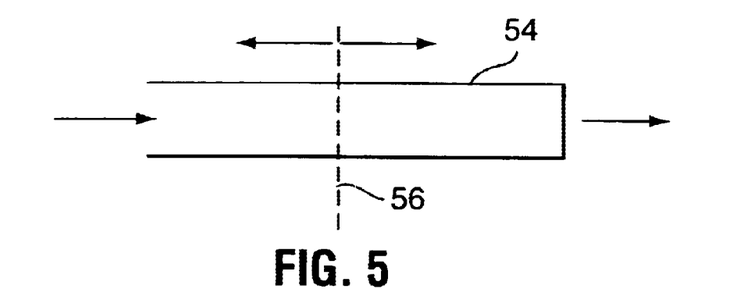
FIG. 5 is a diagram of a queue implementing the present invention having a dynamic discard threshold.

FIG. 5 shows a queue 54 implementing the present invention and having a dynamic discard threshold 56. The discard threshold 56 is dynamic in that when an RM cell containing priority information is received, the discard threshold 56 is adjusted to a value corresponding to the priority indicated in the RM cell. When the RM cell indicates a higher level of priority, the discard threshold 56 is moved to the left. When the RM cell indicates a lower level of priority, the discard threshold 56 is moved to the right. The queue 54 functions in an otherwise identical manner as the queue 50 in FIG. 4. That is, ATM cells with a CLP bit equal to 1 are discarded if the size of the queue exceeds the discard threshold 56.

Figure 6:
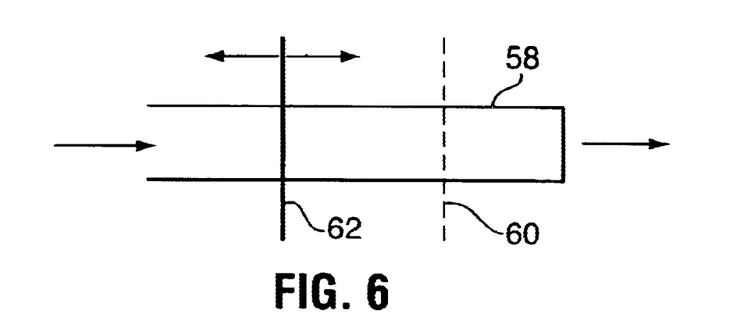
FIG. 6 is a diagram of a queue implementing the present invention having a dynamic discard threshold and a static discard threshold.

In FIG. 6, a queue 58 features two types of discard thresholds, a CLP1 discard threshold 60 and a CLP0 discard threshold 62. The CLP1 discard threshold 60 is static, similar to the discard threshold 52 in FIG. 4. The CLP0 discard threshold 62 is dynamic similar to the discard threshold 56 of FIG. 5. ATM cells with a CLP bit equal to 1 are discarded if the size of the queue exceeds the CLP 1 discard threshold 60. If a received ATM cell has a CLP bit equal to 0 it is only discarded if the size of the queue exceeds the CLP0 discard threshold.

Figure 7:
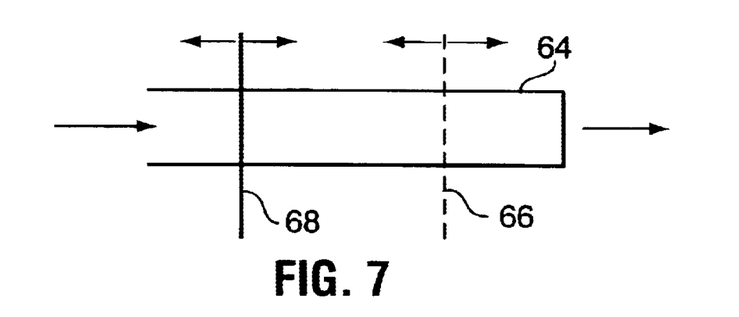
FIG. 7 is a diagram of a queue implementing the present invention having a two dynamic discard thresholds.

In FIG. 7, a queue 64 has a CLP1 discard threshold 66 and a CLP0 discard threshold 68. Both the CLP1 discard threshold 66 and the CLP0 discard threshold 68 are dynamic. That is, the values for both thresholds are adjusted in response to the priority information in RM cells to values corresponding to the priority indicated. Received ATM cells with a CLP bit equal to 1 are discarded if the level of the queue exceeds the CLP1 discard threshold 66. If a received ATM cell has a CLP bit equal to 0, it is only discarded if the level in the queue exceeds the CLP0 discard threshold.

The methods of determining the discard thresholds discussed above with reference to FIGS. 4, 5, 6 and 7 are alternatives which offer advantages and disadvantages with respect to network traffic management as will be appreciated by those skilled in the art. In the examples of FIGS. 4, 5, 6 and 7 queue size is used as a congestion measure and the discard thresholds correspond to those queue sizes at which a certain priority level cell will be discarded. When other congestion measures are used, the discard ranges or thresholds will correspond to those congestion measures.

In this way the ATM network 10 provides a method for carrying traffic from multiple classes of service over a single VC. It should be understood by those skilled in the art that the traffic management of multiple class VCs may be performed not only at VC to VP interfaces such as the VP aggregation point 24, but also, or alternatively, at other contention points such as a VC-to-VC network node or at any point in a network where VC traffic is queued.

Figure 8:
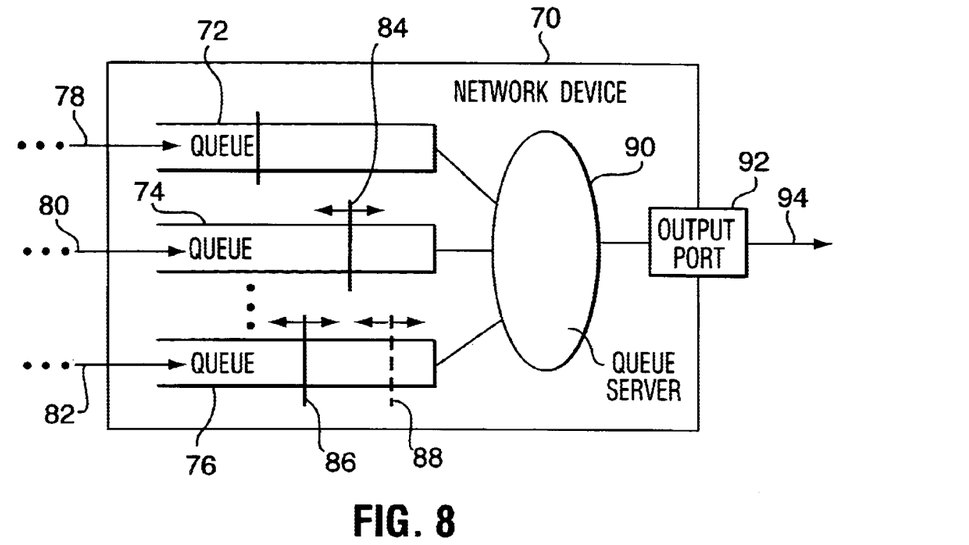
FIG. 8 is a diagram of a network device implementing the present invention according to one specific embodiment thereof.

It will be appreciated that the method of the invention may be implemented in a network device or apparatus such as a switch, router or hub. By way of example, FIG. 8 shows a network device 70 for use in an ATM network and having a plurality of queues 72, 74, 76. Each queue 72, 74, 76 provides queuing for traffic received over VCs 78, 80, 82 respectively. The network device 70 may have more or less queues than are shown in FIG. 8. The VCs 78, 80, 82 are capable of carrying more than two classes of service as describe above. Class of service information is provided to the network device 70 by RM cells received on the VCs 78, 80, 82. The queues 72, 74, 76 accommodate these classes of service with variable discard thresholds. As described with reference to FIGS. 4 to 7 above, the queues 72, 74, 76 may service the received traffic in various alternative ways in response to the priority information in the RM cells. For example, queue 74 has a single dynamic threshold 84 and functions in a manner similar to the queue 54 of FIG. 5. Queue 76 has two dynamic thresholds 86, 88 and functions in a manner similar to the queue 58 of FIG. 6. Cells which are stored in the queues 72, 74, 76 are serviced by a queue server 90 which may provide traffic shaping and arbitration between the queues 72, 74, 76. Cells retrieved from the queues 72, 74, 76 are passed to an output port 92 of the network device 70 which transmits the cells over a connection 94. Other connections could additionally be provided at the output port 92. The connections provided at the output port 92 may be VCs or VPs. The connections may even be non-ATM connections, in which case the network device would have to perform the additional function of converting the ATM cells to a different form of traffic. It will be understood by those skilled in the art that the method of the invention may be implemented in network devices providing different networking functions from the network device 70 described above.

Alternative implementations of the first illustrative embodiment are possible. For example, instead of receiving the IP traffic flow 16, the ATM node 22 in FIG. 2 might receive a plurality of traffic flows over separate connections where each connection is dedicated to carrying traffic of a single fixed priority. In such an arrangement, traffic flow from each connection could be queued separately. Because each connection is carrying traffic of a single type of priority, priority indicators are not required on these incoming connections. However, in order to merge the connections onto the single VC1 14 it is necessary to provide the priority information on the VC1 14 as described herein. The incoming connections at the ATM node 22 might even be ATM connections carrying ATM cells. In this case, segmentation would not be performed at the ATM node 22, instead the ATM node 22 would simply merge the cells received from the incoming connections onto the VC1 14 and insert RM cells or other priority indicators, corresponding to the class of service of the connection. However in this particular arrangement, each incoming connection would be capable of providing only one class of service (or two if the CLP bit is used). This may be acceptable in certain network configurations, especially where a connection carries traffic for a single application. In this alternative implementation, it would not be necessary for the ATM node 22 to detect the priority of incoming traffic, since each connection would be assigned a fixed priority. The priority or class of service of a connection may be indicated in a call setup message which requests the establishment of the connection as will be known to those skilled in the art.

The use of priority indicators such as RM cells according to the above described methods may allow the resources of the ATM network 10 to be used more efficiently and is expected to require simpler traffic administration at the nodes by reducing the number of VCs. The cost for this reduction in the number of VCs is the overhead required to send the RM cells. However, in the worst case there would be one RM cell required for each IP packet transmitted since each IP packet has at most only one class of service. IP packets may be of variable length but are generally much longer than the 48 byte ATM payload and will generally be segmented into several ATM cells. Therefore, in the worst case, a RM cell containing priority information should only have to be sent for every several ATM cells. However, it is expected that it will be common for several packets of the same priority to be transmitted consecutively in which case one RM cell would serve as a priority indicator for several IP packets. Thus, it is believed that in general the overhead which may be required for the method of the preferred embodiment should be more than offset by the network efficiencies gained by reducing the number of VCs.

The second illustrative embodiment of the present invention will next be described. According to the second illustrative embodiment, existing bits available in the ATM cell header are used as priority indicators for specifying the relative class of service of the ATM cell. As mentioned above, in the prior art at most a single bit, the CLP bit, was used to indicate the priority of an ATM cell. Thus, in the prior art only two levels of priority were possible in a single connection. In the second preferred embodiment, a second bit in the ATM cell header is used to indicate the priority of the ATM cell, thus allowing for a total of four possible levels of priority to be indicated by the ATM cell header. To accommodate these additional levels of priority, multiple discard ranges corresponding to the different levels of priority are provided in queues in the nodes of the network. The discard ranges are preferably defined by discard thresholds.

The Explicit Forward Congestion Indication (EFCI) bit, which is part of the Payload Type (PT) field of the ATM header, is the preferred additional bit. The EFCI bit is intended to be used in flow control feedback loops for controlling the rate of transmission on a connection. In connections where flow control is not provided, the EFCI bit is unused and is thus available for the purposes of indicating priority according to this method. However, where flow control is used, for example in an ABR (Available Bit Rate) connection, the EFCI bit is otherwise used and thus would is not available to indicate priority. Therefore, the method of the second illustrative embodiment of the invention may only be used for connections which do not employ the EFCI bit for flow control or other purposes.

Figure 9:
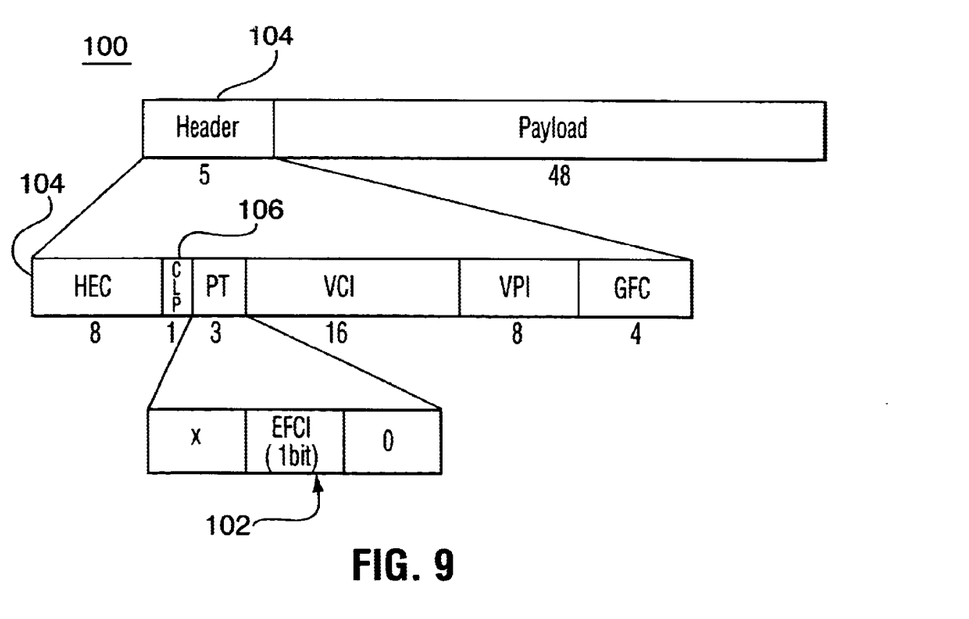
FIG. 9 is a map of an ATM cell revealing the location of the CLP bit and EFCI bit in the header of the cell.

As can be seen from the sample ATM cell 100 of FIG. 9, the EFCI bit 102 is the eleventh bit in the five-octet ATM cell header 104. The CLP bit 106 is the ninth bit in the ATM cell header 104. By using two bits to indicate the priority of an ATM cell, it is possible to specify up to four levels of priority. Each of the four levels of priority is specified by a priority indicator in the form of a unique combination of the setting of two priority-indicating bits, the CLP and EFCI bits. For example, the highest level of priority may be indicated by the setting of both the CLP/EFCI bits to 0/0. The second level of priority may be indicated by 0/1. The third level of priority may be indicated by 1/0. The fourth level of priority may be indicated by 1/1. It will be appreciated that alternate bit settings may be used to indicate the different levels of priority. For ease of reference, the CLP bit and the EFCI bit may be collectively referred to in this disclosure as the "CLP/EFCI bits". Reference to a bit setting in the form of 0/1 is a simplified notation for indicating that the CLP bit is set to 0 and the EFCI bit is set to 1. Other possible bit settings are referred to in a similar manner.

In order to support more than four levels of priority, it will be appreciated that the method of the second illustrative embodiment of the invention may be combined with other methods for indicating priority, for example, the method of the first illustrative embodiment. However, for simplicity, the method of the second illustrative embodiment will be described below without reference to any additional methods.

The method of the second illustrative embodiment may be implemented, by way of example, in the ATM network of FIG. 2. The SAR device 34 receives IP packets from the IP traffic flow 16 and segments the IP packets into ATM cells. According to the second preferred embodiment of the invention, the SAR device 34 also reads priority information from the IP headers of IP traffic received on the IP traffic flow 16 and indicates the priority of the IP traffic by setting the appropriate bits in the headers of ATM cells transmitted onto VC1 14. As mentioned above, up to four levels of priority may be supported by the second illustrative embodiment.

Figure 10:
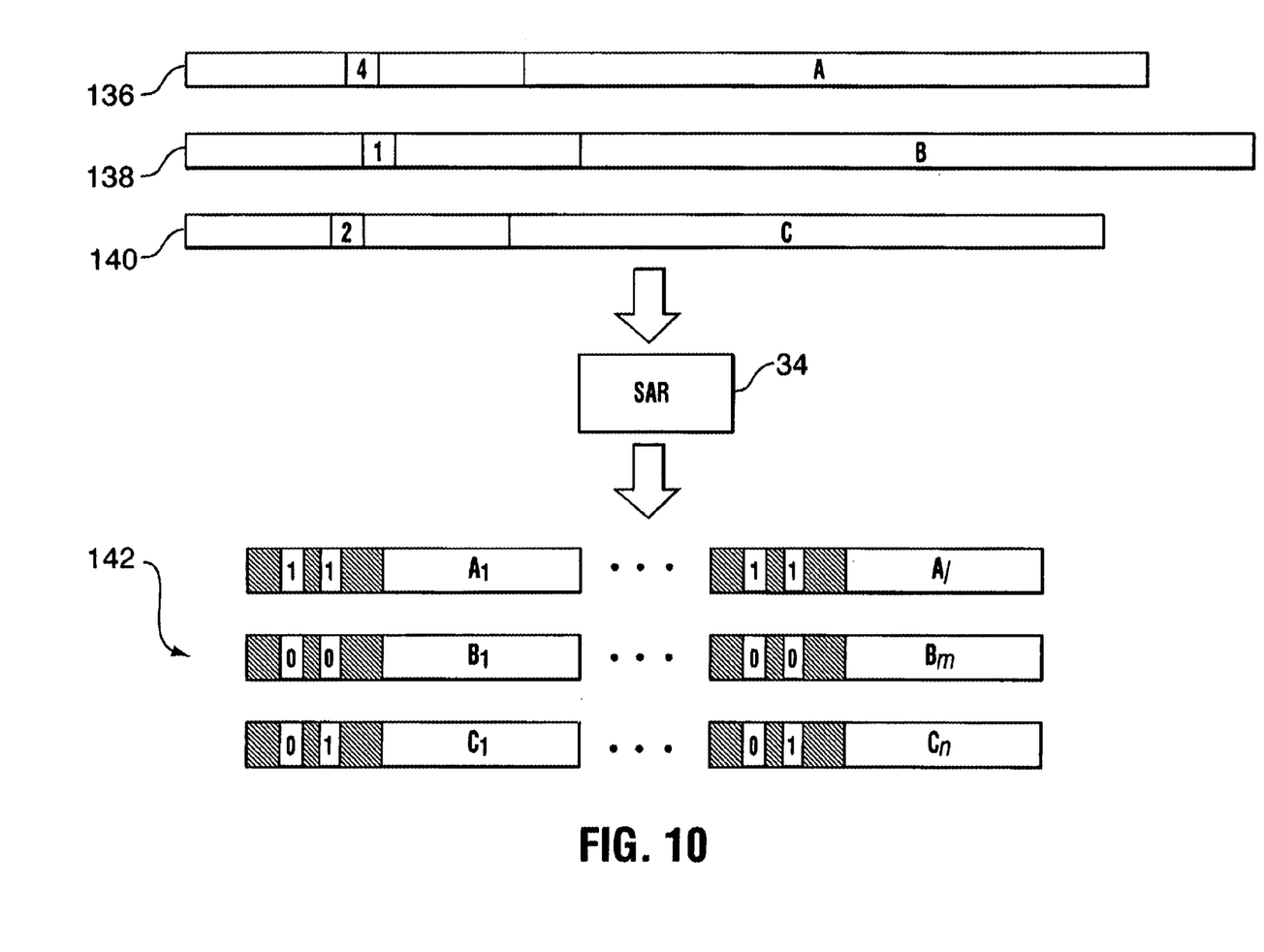
FIG. 10 is a block diagram showing the input and output of a SAR device according to another specific embodiment of the present invention.

FIG. 10 shows an example of a series of ATM cells 142 which is generated by the SAR device 34 according to the second preferred embodiment of the invention. In this example, packet A 136, packet B 138 and packet C 140 are IP packets having varied lengths. The packets 136, 138, 140 each have a different class of service which is specified in the header of each packet. Packet A 136 has a class of service of "4", packet B 138 has a class of service of "1", and packet C 140 has a class of service of "2". For the purposes of this example a lower number indicates a higher class of service. Also in this example, only four levels of priority (identified as priority levels 1 to 4) are provided on the IP traffic flow 16 such that the levels of priority in the IP traffic flow 16 may be mapped to the four levels of priority supported on VC1 14 on a one to one basis. However, it will be appreciated that where more than four classes of service are provided on the IP traffic flow 16, the SAR device 34 may perform a mapping of the various different priority levels on the IP traffic flow 16 to the four available priority levels provided on the single VC. Alternatively, more than one VC may be provided in order to accommodate additional classes of service.

The SAR device 34 segments the packets 136, 138, 140 into a stream of ATM a cells 142. Packet A 136 is segmented into l cells, where l is equal to the size of packet A 136 measured in octets, divided by 48 (the size of an ATM cell payload) and rounded up to an integer value. Each ATM cell containing a portion of packet A 136 includes a priority indicator comprised of the CLP and EFCI bits in the cell header. In the example, packet A 136 has the lowest level of priority indicated by the number "4" in the packet header. Thus, the SAR device 34 indicates this low level of priority by setting the CLP/EFCI bits to 1/1 in those cells of the stream of ATM cells 142 corresponding to packet A 136. Packet B 138 is segmented into m cells based on the length of packet B 138. Because packet B 138 has the highest level of priority (priority level "1") the SAR device 34 sets the CLP/EFCI bits in each of the cells corresponding to packet B 138 to 0/0. Packet C 140 is segmented into n cells. Packet C140 has a priority level of "2", thus the SAR device 34 sets the CLP/EFCI bits of in each of the ATM cell corresponding to packet C 140 to 0/1.

The method by which the CLP/EFCI priority indicator may be used to distinguishing different levels of priority will now be described. When an ATM cell is received at a contention point with a queue, such as VP aggregation point 24 in FIG. 2, the CLP/EFCI bits in the header of those cell are checked in order to determine the level of priority of the incoming ATM cell. The contention point maintains different discard thresholds for the queue for each level of priority. If the size of the queue is greater than or equal to the discard threshold for the level of priority of the ATM cell as indicated by the CLP/EFCI bits, then the ATM cell is not stored in the queue and is discarded. If, on the other hand, the size of the queue is less than the discard threshold corresponding to the level of priority of the ATM cell, then the ATM cell is queued in the queue. The term queue size in this context means the amount of traffic or cells then stored in the queue and does not mean the maximum capacity of the queue. As discussed above with respect to the first illustrative embodiment, congestion measures other than queue size may alternatively be used.

Figure 11:
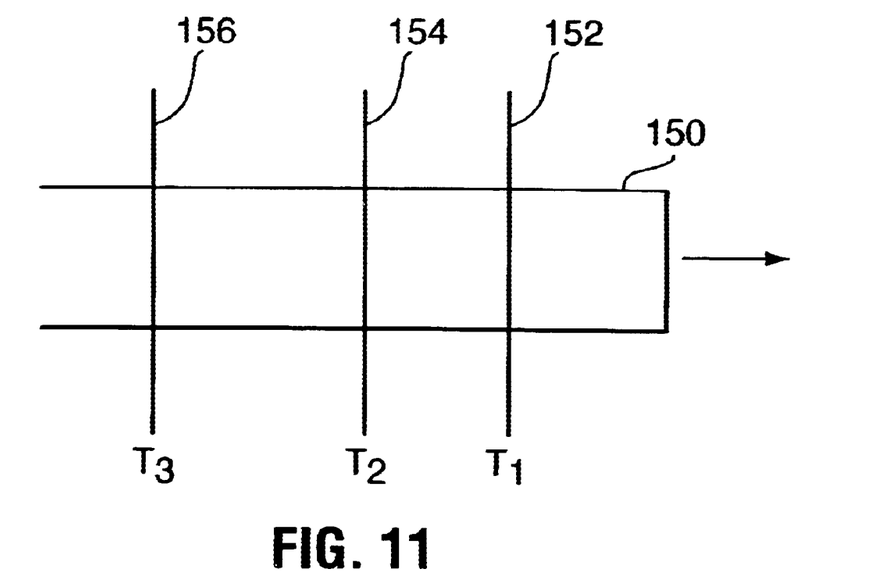
FIG. 11 is a diagram of a queue according to the present invention having three discard thresholds.

Discard thresholds may be determined for a queue according to various methods. For example, FIG. 11 shows a queue 150 having three discard thresholds, T1 152, T2 154 and T3 156. The front of the queue 150 is indicated by the closed end on the right hand side of the queue 150. Threshold T1 152 is closest to the front of the queue 150 while threshold T3 156 is furthest from the front of the queue 150. The three discard thresholds 152, 154, 156 allow for the accommodation of four different levels of priority. If the size of the queue 150 is greater than T3 156 then all cells except those of the highest priority, i.e., those cells having CLP/EFCI bits set to 0/0, are discarded. If the size of the queue 150 is between T2 154 and T3 156, then those cells with CLP/EFCI bits set to 1/0 and 1/1 will be discarded. If the size of the queue 150 is between T1 152 and T2 154 then only cells with CLP/EFCI bits set to 1/1 will be discarded. If the size of the queue is less than T1 152, then no cells are discarded regardless of the values of the CLP/EFCI bits. A fourth threshold (not shown) may also be provided to the left of T3, such that when the size of the queue 150 exceeds the fourth threshold, all incoming cells are discarded regardless of priority.

Figure 12:
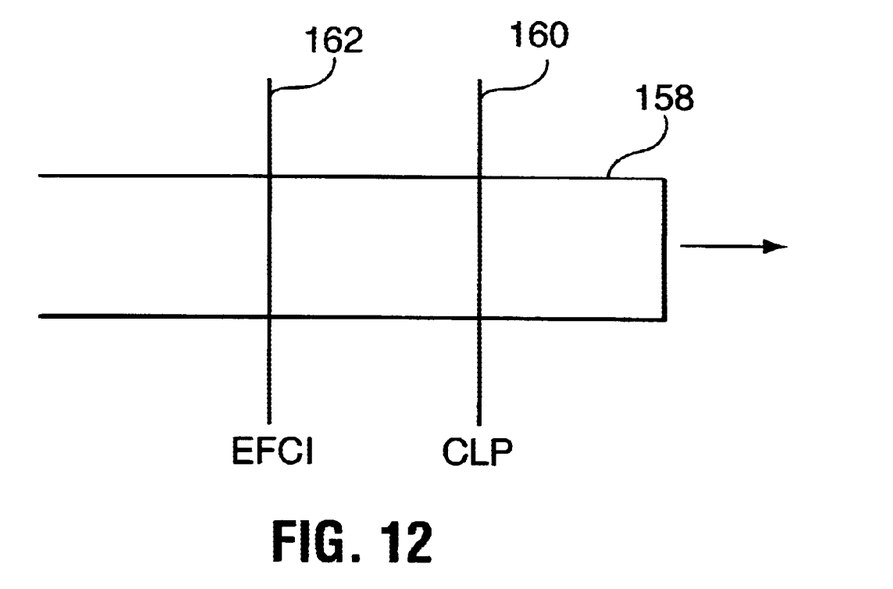
FIG. 12 is a diagram of a queue according to the present invention having two discard thresholds.

An alternative method of establishing thresholds in a queue to distinguish levels of priority may be seen in FIG. 12. In a queue 158, two thresholds are provided, a CLP threshold 160 and an EFCI threshold. If the size of the queue 158 is greater than the CLP threshold 160 and the CLP bit in the header of an incoming ATM cell is set to 1, then the cell will be discarded. If the size of the queue 158 is greater than the EFCI threshold and the EFCI bit is set to 1, then the cell.will be discarded. If the CLP/EFCI bits in the incoming ATM cell are set to 0/0 then the cell will not be discarded, regardless of the size of the queue unless the available memory space for the queue 158 is exhausted. The queue 158 of FIG. 12 provides for the accommodation of three levels of priority for incoming ATM cells.

The actual values for the discard thresholds of the queues implementing the second preferred embodiment of the invention may be determined on a per switch or per node basis depending upon the available buffer space in the switch or node and network design considerations. It will be appreciated that a switch or node implementing queues according to the second illustrative embodiment of the invention might also accommodate VCs which do not use the EFCI bit to indicate priority. For example, in an ABR connection, the EFCI bit is used for flow control and is therefore not available to indicate priority. In order to accommodate flexibility in a network it is desirable to support various types of different connections, including ABR connections and connections which support multiple classes of service. Therefore, a lookup table may be maintained in a switch or node for storing information about each connection including an indication of whether or not the connection supports multiple classes of service according to the second illustrative embodiment. In a lookup table, each connection may be represented by its VPI/VCI number, or, in the case of virtual paths, its VPI only. Other connection identifiers may also be used for these purposes. Those skilled in the art will appreciate the methods by which lookup tables may be established and updated during the setup of connections in a connection oriented network.

In addition to the advantages described in relation to the first illustrative embodiment, the second illustrative embodiment provides a further advantage of reducing the number of RM cells sent over a connection. By reducing the number of RIM cells required to be sent over a connection, the second illustrative embodiment may allow for higher throughput of traffic.

With the methods of the preferred embodiments it is possible to carry all non-real-time traffic over a single VC and still accommodate multiple classes of service. Real-time traffic, on the other hand, can be assigned to a separate VC in order to ensure a minimum level of service that is necessary for reliable transmission. Those skilled in the art will appreciate that the method of the invention may also be applied to real-time traffic in order to provide multiple classes of service in a single real time VC.

The foregoing describes the application of the invention to a Virtual Channel in an ATM network. It will be appreciated by those skilled in the art that the utility of the present invention is not limited to specific types of connections or ATM networks and may be implemented in other types of connections in connection-oriented communications networks. In particular the present invention will find application in other cell based or packet-switched networks where it is desirable to have traffic of multiple classes of service share the connection. Persons skilled in the art will appreciate that the above disclosed method is also not restricted to providing multiple classes of service for Internet traffic but may be applied to many other types of communication traffic where a range of possible priorities is necessary or desired. For example, the application of the invention to other packet switched protocols would require only minor variations to the method applied to Internet traffic. As another example, the invention could also be applied to situations where it is desired to carry various types of traffic, such as voice, data and video, which require different qualities of service. The necessary variations to the methods describe herein would be apparent to one skilled in the art.

Those skilled in this art will appreciate that the present invention has been described herein by way of example only, and that various modifications of detail may be made to the invention, all of which come within its spirit and scope.

What is claimed is:

1. A method for transmitting traffic associated with different priorities over a single connection in a communications network, comprising the steps of:
    (a) transmitting a priority indicator over the connection to a downstream node in the communications network, the downstream node comprising a queue for queuing the traffic received at the downstream node over the connection, the queue being associated with a congestion measure indicative of congestion in the queue and having an adjustable discard range corresponding to the traffic carried over the connection, the priority indicator comprising information for identifying the priority of the traffic on the connection;
    (b) after transmitting the priority indicator, transmitting the traffic over the connection;
    wherein when the priority indicator is received at the downstream node the discard range is adjusted to correspond to the priority identified in the priority indicator, and when the traffic is subsequently received at the downstream node the traffic is stored in the queue if the congestion measure is outside the discard range and the traffic is discarded if the congestion measure is within the discard range.

2. The method of claim 1 wherein the congestion measure is queue size.

3. The method of claim 2 wherein the communications network is an ATM network.

4. The method of claim 3 wherein the priority indicator is a resource management (RM) cell.

5. The method of claim 4 wherein the traffic is transmitted by an ATM network interface, the method further comprising the steps of:
    receiving non-ATM traffic at the ATM network interface, the non-ATM traffic including information indicating a priority associated with the non-ATM traffic; and
    detecting the priority of the non-ATM traffic, wherein the information in the priority indicator corresponds to the detected priority of the non-ATM traffic.

6. A communications network comprising:
(a) a connection for transmitting traffic over the communications network;
(b) a network interface associated with the connection for receiving incoming traffic having a particular priority, for transmitting over the connection a priority indicator comprising information identifying the priority of the incoming traffic, and for transmitting the incoming traffic over the connection as network traffic;
(c) a downstream node connected to the network interface by way of the connection, the downstream node comprising a queue for queuing the network traffic received on the connection at the downstream node, the queue being associated with a congestion measure indicative of congestion in the queue and having an adjustable discard range corresponding to the traffic carried over the connection; and
wherein when the priority indicator is received at the downstream node the discard range is adjusted to correspond to the priority identified in the priority indicator, and wherein the network traffic thereafter received at the downstream node is placed in the queue if the congestion measure is outside the discard range and not placed in the queue if the congestion measure is within the discard range.

7. The communication network of claim 6 wherein the congestion measure is queue size.

8. The communication network of claim 7 wherein the communications network is an ATM network, the priority indicator is a resource management (RM) cell and the network traffic is transmitted over the connection as a series of ATM cells.

9. The communications network of claim 8 wherein the incoming traffic received at the network interface comprises information indicating the priority of the incoming traffic and the network interface detects the priority of the incoming traffic.

10. In a communication network, an apparatus for transmitting traffic associated with one of a plurality of different priorities over a connection to a downstream node having a queue, the queue being associated with a congestion measure indicative of congestion in the queue and having an adjustable discard range corresponding to the traffic carried over the connection, the apparatus comprising an output port connecting the apparatus to the connection, wherein the apparatus transmits to the downstream node a priority indicator comprising information for indicating the priority of the traffic, the downstream node receiving the priority indicator and adjusting the discard range of the queue to correspond to the priority identified in the priority indicator, and wherein after the apparatus transmits the priority indicator the apparatus transmits the traffic to the downstream node, which traffic is discarded if the congestion measure is within the discard range adjusted in response to the previously received priority indicator.

11. The apparatus of claim 10 wherein the communications network is an ATM network.

12. The apparatus in claim 11 wherein the priority indicator is a resource management (RM) cell.

13. The apparatus in claim 12 wherein the apparatus is a network interface and further comprises an input port connected to a second connection in a second communications network, and wherein IP packets are received at the input port, each IP packet comprising information indicating the priority of the IP packet, the network interface segmenting each IP packet into a series of ATM cells, and generating the priority indicator using said information corresponding to the priority of the IP packet.

14. An apparatus for receiving traffic from a connection in a communications network, wherein the traffic comprises network traffic and priority indicators therefore, the apparatus comprising a queue for storing cells received on the connection, the queue being associated with a congestion measure indicative of congestion in the queue and having an adjustable discard range corresponding to the traffic carried over the connection, the discard range being adjustable to correspond to the priority of the received traffic, and wherein each priority indicator comprises information identifying the priority of the network traffic which will be received by the apparatus subsequent to the reception of the priority indicator, the discard range being adjusted to correspond to the priority identified in the priority indicator when a priority indicator is received by the apparatus, the network traffic being stored in the queue if the congestion measure is outside the discard range, and the network traffic not being stored in the queue if the congestion measure is within the discard range.

15. The apparatus in claim 14 wherein the congestion measure is queue size.

16. The apparatus in claim 15 wherein the communications network is an ATM network.

17. The apparatus in claim 16 wherein the priority indicator is a resource management (RM) cell.

18. The apparatus in claim 17 wherein the apparatus is a network interface and further comprises an output port connected to a second connection in a second communications network employing the IP protocol, wherein the network interface converts the network traffic into IP packets comprising priority information corresponding to the priority indicated by the priority indicator and transmits the IP packets from the output port over the second connection.

19. A method for transmitting traffic associated with one of a plurality of different levels of priority over a single connection in an ATM network using ATM cells, each ATM cell having a cell header with a first and a second priority-indicating bit, the method comprising the steps of:
a. in an ATM cell carrying the traffic, setting the first and second priority-indicating bits to values corresponding to the level of priority of the traffic;
b. transmitting the ATM cell over the connection to a downstream node having a queue associated with a congestion measure and having a plurality of discard ranges corresponding to the different levels of priority;
c. at the downstream node, receiving the ATM cell transmitted over the connection and checking the first and second priority-indicating bits thereof to determine the level of priority of the received ATM cell;
d. selecting one of said plurality of discard ranges to correspond to the level of priority identified by said first and second priority indicating bits; and
e. queuing the received ATM cell in the queue if the congestion measure is outside the selected discard range corresponding to the level of priority of the ATM cell and discarding the ATM cell if the congestion measure is within the discard range corresponding to the level of priority of the ATM cell.

20. The method of claim 19 wherein the first priority-indicating bit is the Cell Loss Priority (CLP) bit, and the second priority-indicating bit is the Explicit Forward Congestion Indication (EFCI) bit, and wherein the EFCI bit is not otherwise utilized to indicate congestion over the connection.

21. The method of claim 20 wherein the congestion measure is queue size.

22. The method of claim 21 wherein the queue has a first discard range associated with a first discard threshold and a second discard range associated with a second discard threshold, and wherein during step (d), the ATM cell is discarded if the CLP bit is set to 1 and the size of the queue is greater than or equal to the first discard threshold and the ATM cell is discarded if the EFCI bit is set to 1 and the size of the queue is greater than or equal to the second discard threshold.

23. The method of claim 21 wherein the queue has first, second and third discard ranges defined by first, second and third discard thresholds, the second discard threshold being greater than the first discard threshold, and the third discard threshold being greater than the second discard threshold, the first discard range corresponding to the level of priority indicated by both the CLP and EFCI bits being set to 1, the second discard range corresponding to the level of priority indicated by the CLP bit being set to 1 and the EFCI bit being set to 0, the third discard range corresponding to the level of priority indicated by the CLP bit being set to 0 and the EFCI bit being set to 1.

* * * * *